(12) United States Patent
Hofer et al.

(10) Patent No.: US 11,355,908 B2
(45) Date of Patent: Jun. 7, 2022

(54) CONVEYOR SYSTEM FOR CONVEYING PIECE GOODS WITH IMPROVED ELECTRICAL CONNECTION SYSTEM

(71) Applicant: TGW Mechanics GmbH, Wels (AT)

(72) Inventors: Stefan Hofer, Pollham (AT); Thomas Kriechbaum, Bad Schallerbach (AT); Martin Rausch, Gmunden (AT)

(73) Assignee: TGW Mechanics GmbH, Wels (AT)

( * ) Notice: Subject to any disclaimer, the term of this patent is extended or adjusted under 35 U.S.C. 154(b) by 906 days.

(21) Appl. No.: 16/093,213

(22) PCT Filed: Apr. 13, 2017

(86) PCT No.: PCT/AT2017/060093
§ 371 (c)(1),
(2) Date: Oct. 26, 2018

(87) PCT Pub. No.: WO2017/177252
PCT Pub. Date: Oct. 19, 2017

(65) Prior Publication Data
US 2021/0053764 A1     Feb. 25, 2021

(30) Foreign Application Priority Data
Apr. 13, 2016  (AT) .............................. A50319/2016

(51) Int. Cl.
*H02G 5/02*     (2006.01)
*B65G 13/06*    (2006.01)
(Continued)

(52) U.S. Cl.
CPC ............ *H02G 5/025* (2013.01); *B65G 13/06* (2013.01); *H01R 25/142* (2013.01); *H02K 5/225* (2013.01)

(58) Field of Classification Search
None
See application file for complete search history.

(56) References Cited

U.S. PATENT DOCUMENTS

| 2004/0201972 | A1  | 10/2004 | Walesa |           |
|--------------|-----|---------|--------|-----------|
| 2016/0257500 | A1* | 9/2016  | Reischl | ................. B65G 23/08 |
| 2016/0280463 | A1* | 9/2016  | Reischl | ................. B65G 13/11 |

FOREIGN PATENT DOCUMENTS

| JP | 2003-051362 A | 2/2003 |
| WO | 2012/094690 A1 | 7/2012 |

(Continued)

OTHER PUBLICATIONS

International Search Report of PCT/AT2017/060093, dated Jul. 24, 2017.

*Primary Examiner* — Mukundbhai G Patel
(74) *Attorney, Agent, or Firm* — Collard & Roe, P.C.

(57) ABSTRACT

A conveyor system for conveying of piece goods has frame profiles and an energy supply bus disposed along the frame profile. The conveyor system includes a first connection box for electrical connection of a first actuator, and a second connection box for connection of a second actuator, which differs from the first actuator with regard to its nominal voltage. Furthermore, a modular system includes a first connection box and a second connection box of the type. In particular, a voltage converter is disposed in the second connection box, which converter makes available an output alternating voltage of 110 VAC and/or 230 VAC and/or 400 VAC.

28 Claims, 6 Drawing Sheets

Figure 1:
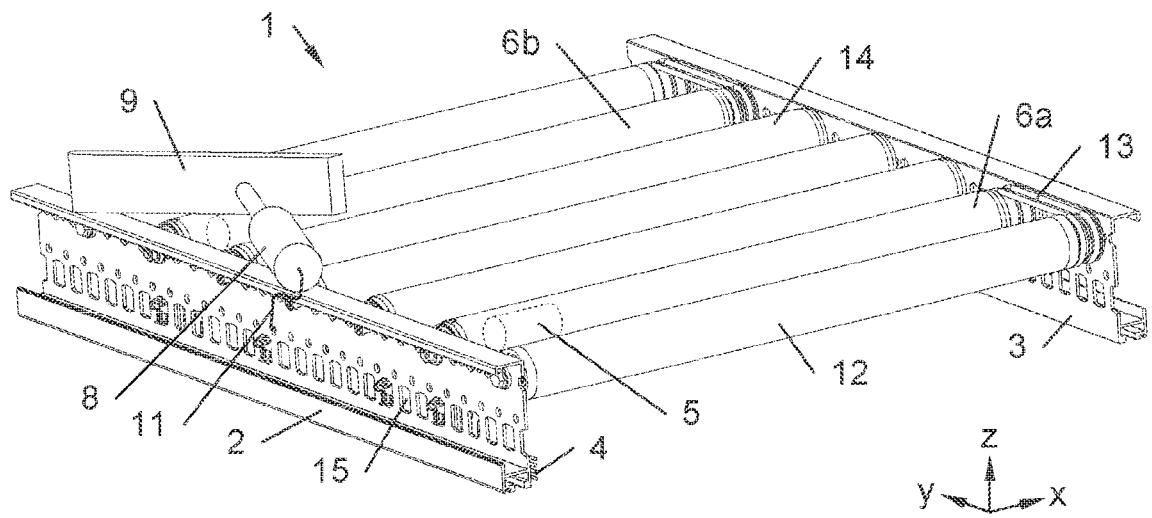

(51) Int. Cl.
*H01R 25/14* (2006.01)
*H02K 5/22* (2006.01)

(56) References Cited

FOREIGN PATENT DOCUMENTS

| | | |
|---|---|---|
| WO | 2013/000005 A1 | 1/2013 |
| WO | 2015/051390 A1 | 4/2015 |
| WO | 2015/051392 A1 | 4/2015 |

\* cited by examiner

CONVEYOR SYSTEM FOR CONVEYING PIECE GOODS WITH IMPROVED ELECTRICAL CONNECTION SYSTEM

CROSS REFERENCE TO RELATED APPLICATIONS

This application is the National Stage of PCT/AT2017/060093 filed on Apr. 13, 2017, which claims priority under 35 U.S.C. § 119 of Austrian Application No. A50319/2016 filed on Apr. 13, 2016, the disclosures of which are incorporated by reference. The international application under PCT article 21(2) was not published in English.

The invention relates to a conveyor system for conveying of piece goods, which system comprises a first and a second frame profile, an electrical energy supply bus, which bus is disposed along the first and/or second frame profile, as well as a first actuator, configured as an electrical rotary motor, for drive of at least one conveying element, which actuator is mounted on the first frame profile and/or second frame profile. Furthermore, the conveyor system has a first electrical connection box, by means of which box the first actuator is connected with the energy supply bus, which box is equipped with first control electronics and is mounted on the first/second frame profile, on which profile the electrical energy supply bus is also disposed. Finally, the conveyor system comprises a second electrical actuator for drive of a functional element, wherein the second electrical actuator differs from the first electrical drive motor with regard to its nominal voltage. Furthermore, the invention relates to a modular system of multiple electrical connection boxes, with a first electrical connection box that is equipped with first control electronics and is configured for being mounted on a frame profile of a conveyor system and for being connected with an electrical energy supply bus, as well as for electrically connecting a first actuator with the energy supply bus. Finally, the invention relates to an electrical connection box that is configured for being mounted in the region of a first/second frame profile of a conveyor system and for being connected with an electrical energy supply bus, as well as for electrically connecting a second actuator with the energy supply bus.

A conveyor system, a modular system, and an electrical connection box of the type indicated above are known from the state of the art. For example, motorized conveying rollers can be electrically supplied using the connection system disclosed above. Within the scope of the development of a conveyor system, the energy supply bus, the first connection boxes, as well as the first actuators (for example motors of a conveying roller) can be well coordinated with one another, so that in total, an overall system that functions well and can be efficiently produced is obtained.

Furthermore, WO 2015/051392 discloses a conveying roller that comprises an axle, a roller body that is mounted to rotate about the axle, as well as a protective cap. The protective cap has a disk-shaped first section for covering the interior of the roller body, which section is disposed in fixed manner relative to the axle and oriented on a normal line relative to the latter. The protective cap also comprises a gutter-like or roof-like second section that is disposed at a slant to the axle and runs over a partial length of the roller body, at a radial distance from the latter. A connection cable of the conveying roller can be guided, in an arc or a loop, to an electrical interface with a connection box of the conveyor system, wherein the lowest point of the arc/the loop comes to lie below the said interface.

However, it is problematical that conveyor systems frequently have to be adapted to customer requirements, for example because a new conveyor system must be integrated into an existing system, or because specific components are specified on the part of the customer. For example, these components can be a lifting mechanism, a barrier flap, a stop, a rejecter and/or an acceleration roller, which are operated with a second actuator that differs from the first actuator.

Fundamentally, this problem is solved, up to now, in that these components are connected with the electrical system using a separate cable that is guided along the conveyor system to a control cabinet. Although this is still acceptable in the case of individual components, in the case of a greater number it leads to a confusing, error-prone, and also optically unattractive overall system.

In part, the problem is also countered in that the first connection boxes, which are intended for the first actuator, make an expanded functionality available, and thereby connection of second actuators (or also sensors) is also made possible. By its nature, provision of all possible eventualities rapidly leads to a technically confusing connection box, which is very much error-prone. Fundamentally, it is impossible, in any case, to anticipate all future requirements, and therefore this approach is useful only with restrictions, in any case.

It is therefore a task of the invention to indicate an improved conveyor system, an improved modular system, and an improved electrical connection box. In particular, the problems indicated above are supposed to be overcome, and a connection system that can be used in flexible manner is supposed to be made available, using which system it is possible to cater to customer requirements without worsening the clarity and the error rate of the conveyor system.

The task of the invention is accomplished with a conveyor system of the type stated initially, which system additionally comprises a second electrical connection box, by means of which box the second actuator is connected with the energy supply bus and which box is mounted in the region of the first/second frame profile, on which the electrical energy supply bus is also disposed.

Furthermore, the task according to the invention is accomplished by means of a modular system of the type stated initially, which system comprises a second electrical connection box, which box is configured for being mounted in the region of the said frame profile and for being connected with an electrical energy supply bus, as well as for electrically connecting a second actuator with the energy supply bus, which actuator differs from the first actuator with regard to its nominal voltage.

Finally, the task of the invention is accomplished by a connection box of the type stated initially, wherein a voltage converter is disposed in the connection box, which converter makes available an output alternating voltage of 110 VAC and/or 230 VAC and/or 400 VAC.

By means of the measures proposed, it is possible, in particular, to easily integrate outside actuators into a conveyor system, wherein the nominal power of the second actuator should not exceed the nominal power of the energy supply bus. Separate cabling, as is required according to the state of the art, can therefore be eliminated. Also, the need is eliminated to equip all the first connection boxes in view of all possible eventualities that might occur. By means of the provision of a special type of connection box, the costs of the overall system can be reduced. This is an absolutely surprising effect, because usually, it is an aim to reduce the variety of types of the components used in a conveyor system. For example, a (motorized) conveying roller can be provided as a conveying element. In particular, a lifting mechanism, a barrier flap, a stop, a rejecter and/or an acceleration roller or the like can be provided as a functional element that is driven by the second actuator. The second actuator can also, in particular, be connected with the second connection box only temporarily. At this point, it is also stated that not only does the first actuator differ from the second actuator in terms of its nominal voltage, but also, the assigned nominal currents can be different.

Advantageous embodiments and further developments of the invention are now evident from the dependent claims, as well as from the description in conjunction with the figures.

It is advantageous if the second electrical connection box is mounted on the first/second frame profile and connected with the electrical energy supply bus in the same manner as the first connection box. As a result, installation of the conveyor system takes place in particularly intuitive manner, since no distinction needs to be made between the first connection box and the second connection box with regard to attaching the connection boxes on the frame profile.

However, it is also advantageous if the second electrical connection box is connected with the electrical energy supply bus both electrically and mechanically. In particular, the second connection box is mechanically connected only with the electrical energy supply bus. This means that the second connection box is not directly connected with the first/second frame profile, but rather only indirectly, by way of the energy supply bus mounted on the first/second frame profile. Specifically, the second connection box can have at least one engagement projection, with which the connection box is mounted (in other words "clipped onto") the energy supply bus. In this regard, the at least one engagement projection can interact with the electrical conductors of the energy supply bus and/or also with an insulator of the latter. This insulator can be formed, for example, by a plastic profile in which the electrical conductors of the energy supply bus are embedded. In particular, the electrical conductors can be clipped into the said plastic profile.

It is furthermore advantageous if the first/second frame profile has multiple recesses spaced apart from one another in the longitudinal direction of the first/second frame profile, and the second connection box has two first projections, spaced apart from one another in the longitudinal direction of the first/second frame profile, wherein the distance between the first projections is less than the width of a recess, measured in the longitudinal direction of the first/second frame profile, but greater than the distance between two recesses. In this manner, the second connection box can be locally fixed in place in the longitudinal direction of the first/second frame profile. In this regard, the two projections of the second connection box project either into the same recess of the frame profile or into adjacent recesses. In the latter case, a crosspiece of the frame profile that lies between the two recesses lies between the two projections. Specifically, the outer spacing of the two first projections can essentially correspond to the width of a recess, and the inner spacing of the two first projections can essentially correspond to the distance between two recesses. As a result, displacement of the second connection box in the longitudinal direction of the first/second frame profile is practically entirely excluded. The statement "essentially" means, in the given connection, in particular, a deviation of 10%. Although the local fixation of the connection box is advantageous, it is not compulsory. Instead, it is also conceivable that the second connection box has no such projections and is freely displaceable in the longitudinal direction of the first/second frame profile.

In a further advantageous embodiment variant, the second electrical connection box has second projections, which lie between electrical conductors of the energy supply bus. As a result, the electrical conductors are positioned well in the region of the second connection box and are held particularly well in a plastic profile into which the electrical conductors are clipped.

It is furthermore particularly advantageous if contacts of the first connection box, which produce the electrical connection with the energy supply bus, are configured for transmission of a nominal current/nominal power of the first actuator, and contacts of the second connection box, which produce the electrical connection with the energy supply bus, are configured for transmission of a nominal current/nominal power of the energy supply bus. As a result, a clearly greater electrical power can be transmitted to the second actuator than to the first actuator. For example, fifty or more conveying rollers, in other words first actuators, can be supplied by one energy supply bus. Accordingly, fifty times the electrical power of the first connection box can be transmitted by way of the second connection box, for example. Accordingly, larger/more contacts are provided in the second connection box than in the first connection box.

However, it is also advantageous if contacts of the first connection box, which contacts produce the electrical connection with the energy supply bus, and contacts of the second connection box, which contacts produce the electrical connection with the energy supply bus, are configured for transmission of a nominal current/a nominal power of the energy supply bus. In this manner, the same contacts can be used for the first connection box and the second connection box, and thereby cost advantages in the overall system occur, under some circumstances, due to standardization, although the contacts of the first connection box are actually over-dimensioned, from a technical point of view.

In a further advantageous embodiment of the conveyor system, the energy supply bus has a first voltage bus and a second voltage bus, separate from the first, wherein the nominal power of the first voltage bus exceeds the nominal power of the second voltage bus, in particular by at least ten times. As a result, the components installed in a conveyor system can be uncoupled from one another with regard to their energy supply. For example, a first group of electrical consumers can be connected with the first voltage bus, while a second group of electrical consumers can be connected with the second voltage bus. In particular, the first group can contain relatively high-power actuators, and the second group can tend to contain components having a lower power demand, for example a controller for the first actuators. As a result, the said controllers are uncoupled from the first voltage bus. Problems on the first voltage bus, for example caused by the drive electronics (e.g. a circuit for drive of a brushless motor, which circuit produces a rotational field and is variable in power), therefore do not have any effect on the said controllers (e.g. the control part of the said drive electronics). In particular, the controllers themselves are not impaired, even in the case of a total failure of the first voltage bus, and can continue to deliver and store signals for the position determination of conveyed objects. Re-startup of the conveyor system is thereby facilitated. In view of the group affiliation of the components installed in a conveyor system, as stated above, the first voltage bus can also be viewed as and/or referred to as a "power voltage bus," and the second voltage bus can also be viewed as and/or referred to as a "control voltage bus."

It is furthermore advantageous if the nominal voltage of the first voltage bus is different from the nominal voltage of the second voltage bus, and, in particular, exceeds the former by at least two times. As a result, the currents transmitted by way of the first voltage bus can be kept relatively low, in spite of comparatively high electrical power, and thereby the cable cross-sections also remain small. In particular, the conductor cross-sections of the first voltage bus and of the second voltage bus differ by maximally two times the value, or are actually the same, and this facilitates contacting in the connection box. For example a voltage of 48 V can be provided for the first voltage bus, and a voltage of 24 V can be provided for the second voltage bus. Other values are also conceivable, of course, specifically, for example, 30 V for the first voltage bus and 12 V for the second voltage bus.

It is furthermore advantageous if the first electrical connection box and the second electrical connection box comprise first contacts that are connected with the first voltage bus, and/or comprise second contacts that are connected with the second voltage bus. In this manner, a controller of the second actuator can also be supplied by way of the second voltage bus (control voltage bus). It is furthermore conceivable that a data bus may be present, by way of which data are transmitted and passed on to the second actuator or a controller of the same, using the second connection box. However, data can fundamentally be modulated onto the second voltage bus (Powerline Communication). As mentioned above, the voltage at the first voltage bus can amount, in particular, to 48 V, and, at the second voltage bus, in particular to 24 V. Accordingly, specifically actuators having an operating voltage of 48 V, as well as sensors having an operating voltage of 24 V can be connected at the first connection box, and actuators having an operating voltage of 24 V or 48 V can be connected at the second connection box.

In particular, the contacts mentioned above can correspond to the first contacts, which produce the electrical connection with the first voltage bus of the energy supply bus. This means that the contact size mentioned above relates to the first voltage bus and not to the second voltage bus.

In a further advantageous variant of the conveyor system, the second actuator is connected essentially with the first voltage bus, by way of the second connection box, in terms of power. This means, in particular, that more than 95% of the electrical power transmitted to the second actuator comes from the first voltage bus. Specifically, the second actuator can also be connected exclusively with the first voltage bus, by way of the second connection box. By means of these measures, the second voltage bus is kept free of high-power consumers and of problems caused by them. In particular, all the second actuators can be connected essentially or exclusively with the first voltage bus, by way of the second connection boxes, in terms of power.

It is also advantageous, in the above connection, if the supply voltage passed on to the second actuator by the second connection box corresponds to the voltage at the second voltage bus. In this manner, the second voltage bus is kept free of high-power consumers and of problems caused by them, even if the second voltage bus were to lend itself for connection of the second actuator, with regard to its nominal voltage.

It is advantageous if the supply voltage passed on to the second actuator by the second connection box is adjustable, in particular using a voltage converter. It is also particularly advantageous, in this connection, if the voltage converter is configured for converting an input direct voltage into an output alternating voltage or for converting an input alternating voltage into an output direct voltage. In a further particular embodiment, a voltage converter is disposed in the second connection box, in particular as the sole electronic circuit.

By means of the measures proposed above, even actuators that are actually unsuitable with regard to their nominal voltage can be installed in the conveyor system. As a result, custom-built systems, for example at the customer's request, can be implemented in comparatively simple manner. For example, the voltage that is passed on can be predetermined in fixed manner, can be adjustable to one of several values predetermined in fixed manner, or can be adjustable in altogether variable manner. The output voltage can amount, for example, to 5 V, 12 V, 24 V, 48 V or even 230 V. The output voltage can be a direct voltage or an alternating voltage.

Specifically, the connection box can also have an outlet for 110 V, 230 V or 400 V, or can be configured for connection of such an outlet (this means it can output an alternating voltage of 110 V and/or 230 V and/or 400 V). In this manner, standard devices (cleaning devices, vacuum cleaner, compressor, drill, grinding machine and the like), for example, can be briefly connected with the conveyor system during overhauls of the conveyor system, without excessively long extension cables being required. Since the conveyor system is at a standstill during the overhaul, in any case, the connected consumers can draw the entire nominal power of the energy supply bus. For example, an input direct voltage of 48 VDC can be converted to an output alternating voltage of 230 VAC. But converting an input alternating voltage into an output direct voltage is also conceivable, for example from 24 VAC to 5 VDC. The electronic circuits for implementation of the aforementioned functions are actually known, and are configured, for example, as step-up converters, step-down converters, inverters or a combination of the same. At this point, it is also noted that the control voltage passed on to the second actuator can also be changed in the second connection box, with regard to their amount and their form (direct voltage/alternating voltage).

It is furthermore conceivable that second connection boxes that deliver a dangerous output voltage (in particular greater than 48 V) are switched to be active only in a maintenance case. During regular operation, however, they remain inactive. For example, this can take place by means of a relay, which is energized or dropped by means of a corresponding command of a central controller.

It is furthermore conceivable that second connection boxes that deliver a dangerous output voltage (in particular greater than 48 V) are mounted on the conveyor system only temporarily, in any case, for example for the duration of a maintenance procedure. For example, the maintenance personnel can bring such a second connection box along and temporarily install it at the maintenance location. As a result, it is possible to do without extension cables, on the one hand, but also it is not necessary for a plurality of second connection boxes with outlets to be installed in the conveyor system. The gain in convenience for maintenance personnel can therefore be achieved with little technical effort.

In a further aspect of the invention, electrical devices (cleaning devices, vacuum cleaner, compressor, drill, grinding machine and the like) required for a maintenance case and/or spare parts are stored in a loading device (e.g. a container, box, pallet, tray or the like) in an automated storage unit with storage shelves and at least one shelf storage and retrieval device, and, when needed, conveyed to the location at which maintenance is to take place, using a shelf storage and retrieval device and/or using conveying elements of the conveyor system (e.g. provisioning conveyor and/or lifter and/or paternoster elevator and/or roller conveyor having motorized conveying rollers). The loading device can, in particular, also contain a second connection box having an outlet for the devices mentioned, and, of course, can also contain a non-motorized tool (e.g. wrench, screwdriver and the like). In this manner, maintenance personnel can go the maintenance location without having to carry (heavy) equipment along. Maintenance of the conveyor system can therefore be carried out significantly more conveniently and also more efficiently than was possible until now.

In the same manner, the tools and defective components of the conveyor system can also be transported away using this (or another) loading device. In particular, in the case of heavy parts to be replaced and/or in the case of maintenance work that is performed at a great height, the maintenance personnel can be clearly assisted by the proposed measures. In the manner described, the defective components can be transported to a location where they can be removed from the loading device easily and without risk, and transported away further. For example, the defective components are simply transported to a picking workstation and disposed of from there or brought to a repair location. The defective components can, of course, first be transported to a storage shelf of the conveyor system and temporarily stored there.

The loading device can furthermore be designed to have noticeable coloring or can also have a signal light (for example a rotating light), for example. In this manner, maintenance personnel can be guided to the maintenance location. Complicated path descriptions or reading of complicated plans can therefore be eliminated.

It is furthermore particularly advantageous if the first/second frame profile is connected with a protective ground wire, the second connection box is electrically connected with the first/second frame profile, and the second connection box makes a protective ground wire connector on the output side. In this manner, even electrical devices that are not protectively insulated can be operated at the second connection box, which makes an outlet for 110 VAC, 230 VAC and/or 400 VAC or a connector for such an outlet available, for example. Of course, it is also conceivable that for this purpose, a separate protective ground wire is provided, which is in the Special Part of the energy supply bus.

In a further particular embodiment of the modular system or of the conveyor system, the second connection box differs structurally from the first connection box. In this manner, the two connection boxes can be optimally adapted to their purpose of use. For example, the first connection box can have control electronics for the first actuator, whereas the second connection box has no such control electronics. These can be part of the second actuator, for example.

However, it is also advantageous if the first connection box and the second connection box are identical with regard to their outer dimensions and/or the placement of contacts for contacting with the electrical energy supply bus. In this manner, both types of connection boxes can be installed on the conveyor system without adaptations. For example, the two connection boxes can be attached ("clipped onto") a frame profile in the same manner, using an engagement connection.

Furthermore, it is advantageous if the first connection box has a jack/a plug for connection of the first actuator, and the second connection box has terminals for connection of the second actuator. In this manner, the second connection box can be used in significantly more flexible manner, since the actuator connected with it does not need to have a matching plug/a matching jack. The terminals of the second connection box can be configured as screw terminals or spring terminals, for example. In place of terminals or in addition to them, the second connection box can, of course, also have jacks and/or plugs.

Finally, it is also advantageous if the second electrical connection box can be mounted without tools in the region of the first/second frame profile. In this manner, the second connection box can be attached to the conveyor system in particularly simple manner (and, in particular, only temporarily).

At this point, it is noted that the embodiments disclosed with regard to the conveyor system, and the resulting advantages relate equally to the modular system presented, and to the second connection box presented, and vice versa.

For a better understanding of the invention, it will now be explained in greater detail using the following figures.

Figure 2:
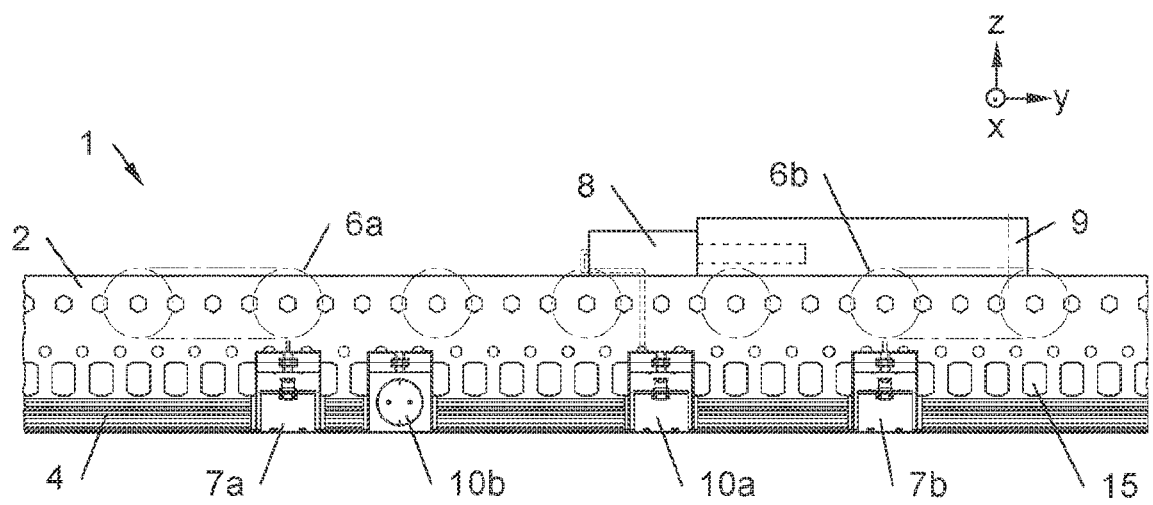
Figure 3:
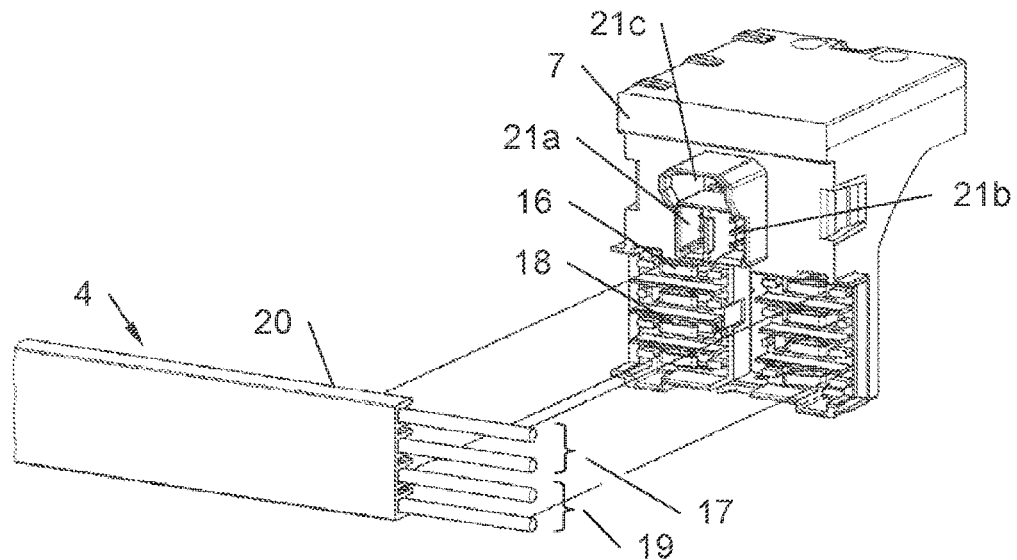
Figure 4:
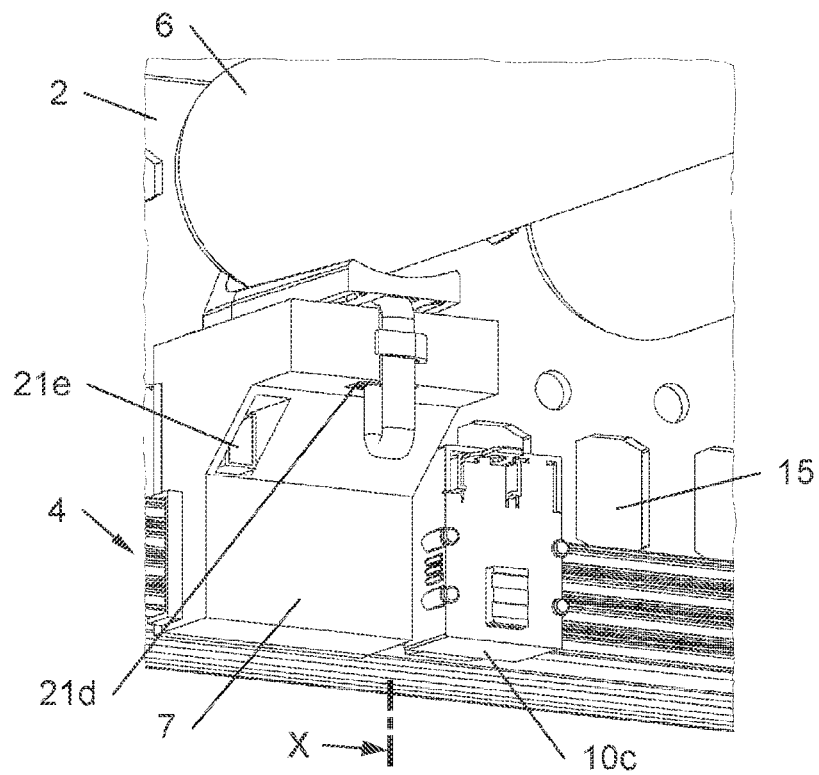
Figure 5:
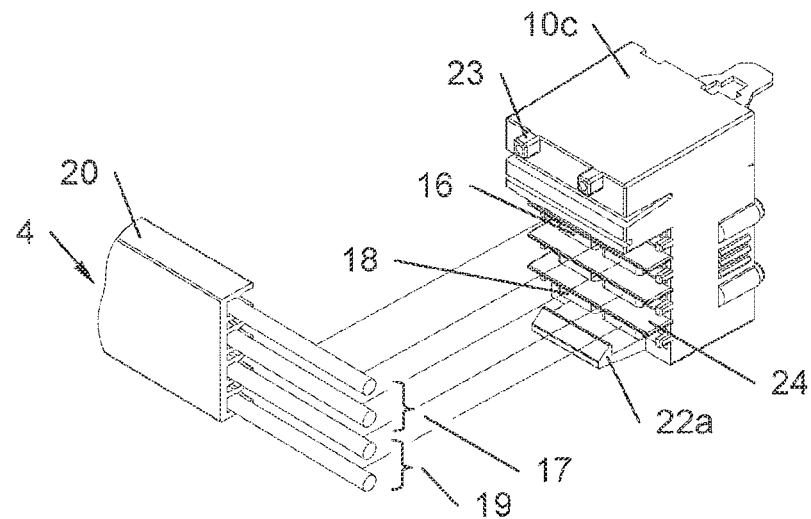
Figure 6:
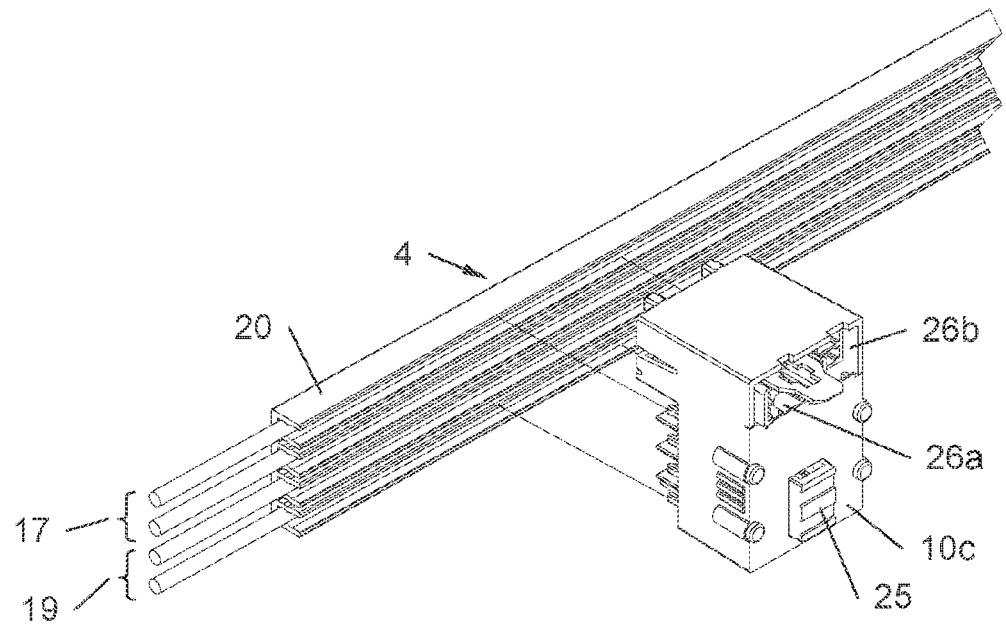
Figure 7:
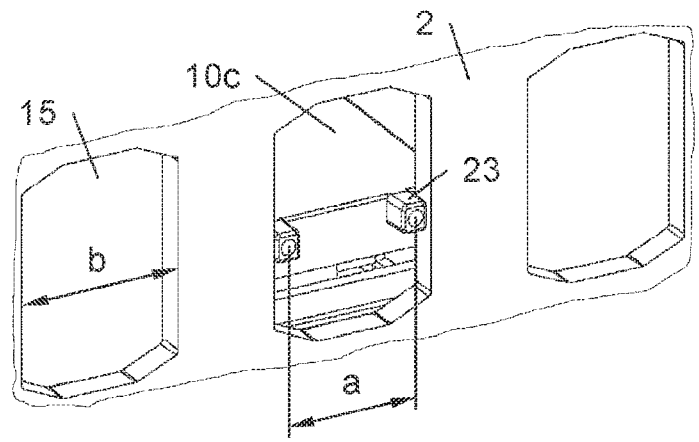
Figure 8:
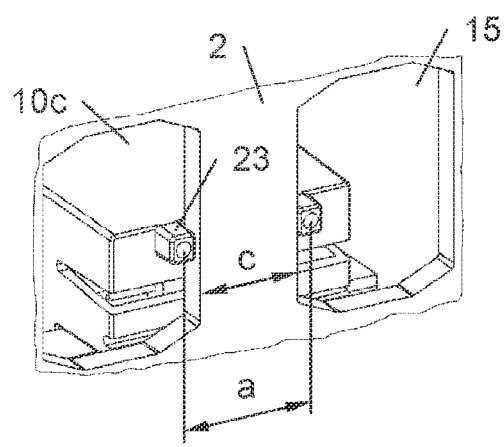
Figure 9:
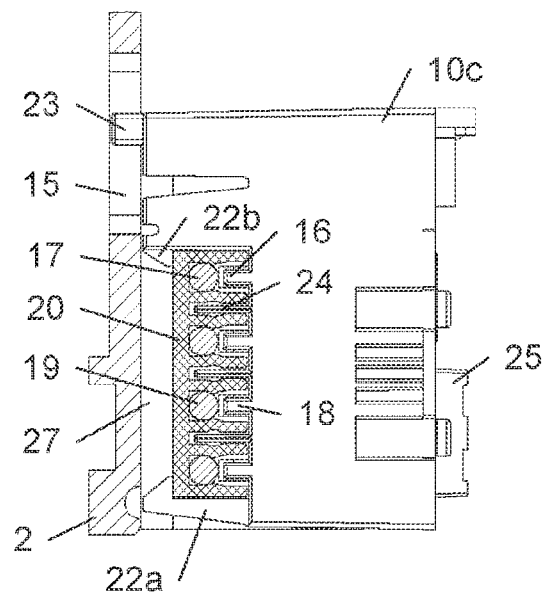
Figure 10:
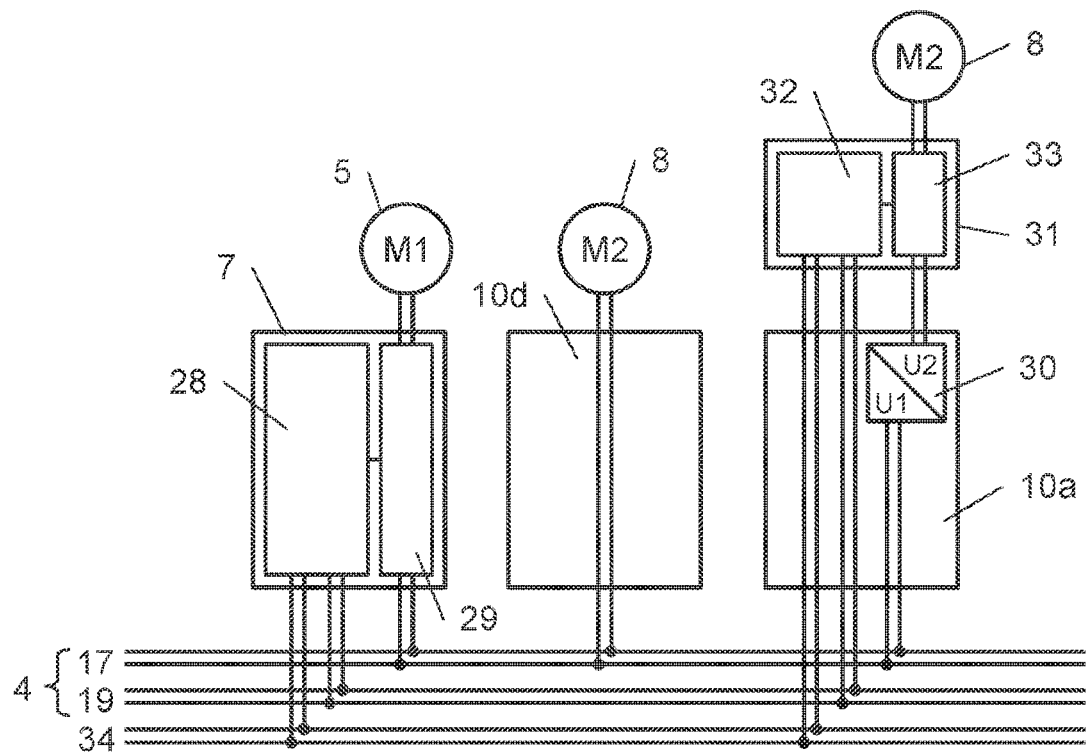
Figure 11:
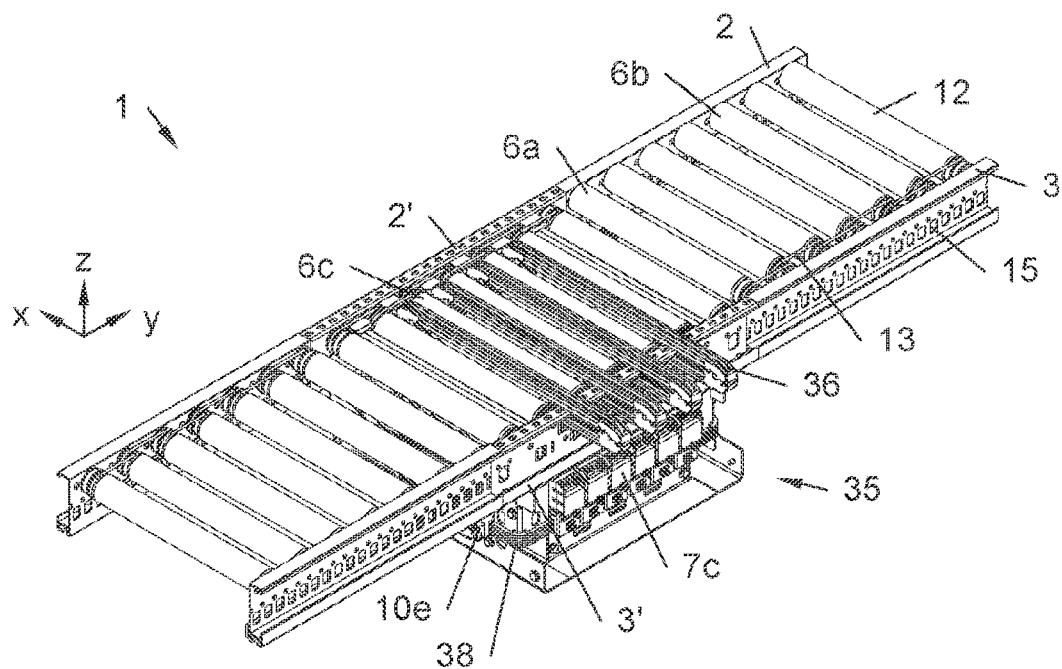

The figures show, each in a greatly simplified, schematic representation:

FIG. 1 a section of an exemplary conveyor system for conveying of piece goods, in a slanted view;

FIG. 2 a view of the inside of the conveyor system section shown in FIG. 1;

FIG. 3 a first connection box and an energy supply bus at a slant from the rear, in an exploded representation;

FIG. 4 a first and second connection box having different designs, viewed at a slant from below;

FIG. 5 a second connection box and an energy supply bus at a slant from the rear, in an exploded representation;

FIG. 6 the second connection box from FIG. 5, seen at a slant from the front;

FIG. 7 the second connection box from FIG. 5, the first projections of which project into a single recess in the frame profile;

FIG. 8 the second connection box from FIG. 5, the first projections of which project into two different recesses in the frame profile;

FIG. 9 a side view of the second connection box from FIG. 5, as well as a cross-section through a frame profile part and through the energy supply bus according to the section line X in FIG. 4;

FIG. 10 an exemplary electrical circuit diagram of first and second connection boxes connected with the energy supply bus;

FIG. 11 a further detail of the exemplary conveyor system, at a slant from above, and FIG. 12 the conveyor system from FIG. 11, at a slant from below.

As an introduction, it should be stated that in the different embodiments described, the same parts are provided with the same reference symbols or the same component designations, wherein the disclosures contained in the entire description can be transferred analogously to parts that are the same and have the same reference symbols or the same component designations. Also, the position information selected in the description, such as top, bottom, side, etc., for example, is related to the figure being directly described and shown, and must be transferred analogously to the new position in the case of a change in position.

FIG. 1 shows an example of a conveyor system 1 for conveying of piece goods in a slanted view, or of a section of such a conveyor system 1. FIG. 2 shows the inside of the conveyor system 1 or of the inside of the said section. Piece goods are, for example, loading devices, containers, cartons, trays, packaging units (parcels) and the like.

The conveyor system 1 comprises a first frame profile 2 and a second frame profile 3, as well as an electrical energy supply bus 4, which is disposed along the first frame profile 2. The conveyor system 1 furthermore has a first actuator 5, configured as an electrical rotary motor, for drive of at least one conveying element 6a, which is mounted on the first frame profile 2 and second frame profile 3 according to this embodiment. In concrete terms, the conveying element 6a is configured as a conveying roller in this example, which roller is mounted between the first and the second frame profile 2, 3. However, it would also be conceivable, for example, that the conveying element 6a is configured as a deflection roller of a conveyor belt. Aside from the conveying roller 6a, a second motorized conveying roller 6b is also shown in FIGS. 1 and 2. In the above example, the conveying element 6a is attached to both frame profiles 2, 3. However, it is also possible to attach the conveying element 6a only on one frame profile 2, 3 (in particular on the first frame profile 2).

The conveyor system 1 furthermore comprises two first electrical connection boxes 7a, 7b, by means of which the first actuators/motors 5 of the conveying roller 6a, 6b are connected with the energy supply bus 4. The connection boxes 7a, 7b are each equipped with first control electronics (see also FIG. 10), and are mounted on the first frame profile 2 on which the electrical energy supply bus 4 is also disposed.

Furthermore, the conveyor system 1 comprises a second electrical actuator 8 for drive of a functional element 9, wherein the second electrical actuator 8 differs from the first electrical drive motor 5 with regard to its nominal voltage. In the concrete case, the functional element 9 is configured as a rejecter in the example shown, and the second actuator 8 is configured as a linear motor (for example as a spindle motor). The functional element 9, which is driven by the second actuator 8, can also be configured as a lifting mechanism, a barrier flap, a stop, an acceleration roller or the like, for example, and the second actuator 8 can, of course, also be configured as a rotary motor.

Finally, the conveyor system 1 also comprises a second electrical connection box 10a, by means of which the second actuator 8 is connected with the energy supply bus 4, and which is mounted in the region of the first frame profile 2, on which the electrical energy supply bus 4 is also disposed.

By means of the proposed measures, outside second actuators 8, in particular, can easily be integrated into a conveyor system 1, wherein the nominal power of the second actuator 8 should not exceed the nominal power of the energy supply bus 4. Separate cabling, which is guided along the first frame profile 2 only for the second actuator 8, as is required according to the state of the art, can therefore be eliminated. Only a relatively short connection cable 11 between the second actuator 8 and the second connection box 10a is required.

Aside from the components already addressed, the conveyor system 1 comprises passively driven conveying rollers 12, which do not have a separate motor 5, but are driven along by the conveying rollers 6a, 6b, by way of belts 13. Furthermore, idling rollers 14 are also provided, which are not driven at all. Of course, one possibility also consists in that all the conveying rollers 6a, 6b of the conveyor system 1 are each equipped with a motor 5.

Finally, the frame profiles 2, 3 have multiple recesses 15, spaced apart from one another in the longitudinal direction, into which recesses the first connection boxes 7a, 7b and also the second connection box 10a project. This serves for fixation of the first connection boxes 7a, 7b and of the second connection box 10a in longitudinal direction of the first frame profile 2, on the one hand, and, on the other hand, in this manner an electrical connector of the first connection boxes 7a, 7b and/or second connection box 10a can also be guided to the outside of the first frame profile 2 (see also FIG. 3).

The first and second frame profile 2, 3 are configured essentially as mirror images of one another. If necessary, the first frame profile 2 can therefore take the place of the second frame profile 3 and vice versa. For example, the electrical energy supply bus 4, the first connection boxes 7a, 7b, and the second electrical connection box 10a can also be attached to the second frame profile 3.

In FIG. 2, a further design of a second connection box 10b is shown, which makes an outlet for connection of an electrical device available. In this regard, the outlet can be configured in accordance with DIN VDE 0620-1, for example, and can correspond to a conventional outlet also used in households. From what has been said, it becomes clear that the second actuator 8 does not necessarily need to be permanently connected with the energy supply bus 4, and also does not need to be connected with the conveyor system 1 in fixed manner. The area of use of the outlet and the possible designs of a second connection box 10b will still be discussed in detail below.

In the example shown in FIGS. 1 and 2, the second electrical connection boxes 10a, 10b are mounted on the first frame profile 2 and connected with the electrical energy supply bus 4 in the same manner as the first connection boxes 7a, 7b. As a result, assembly of the conveyor system 1 takes place in particularly intuitive manner, since no distinction needs to be made between the first connection boxes 7a, 7b and the second connection boxes 10a, 10b with regard to attachment of the first and second connection boxes 7a, 7b and 10a, 10b on the first frame profile 2. Fundamentally, however, a second connection box 10a, 10b can also be mounted on the first frame profile 2 and connected with the electrical energy supply bus 4 in different manner than the first connection boxes 7a, 7b (see FIGS. 4 to 9).

FIG. 3 shows the first connection box 7, now at a slant from the rear, in an exploded representation, with the energy supply bus 4. The first frame profile 2 is not shown in FIG. 3. The first connection box 7 has first contacts 16 that produce contact with a first voltage bus 17 and second contacts 18 that produce the electrical contact with a second voltage bus 19. In the example discussed, the first voltage bus 17 has two electrical conductors (wires here), which are locked into a plastic profile 20 or clipped into it. Accordingly, the second voltage bus 19 has two further electrical conductors, which are also formed by wires and which are also locked into the aplastic profile 20 or clipped into it.

In the concrete example, the energy supply bus 4 comprises a plastic profile 20 (an insulator), which forms holders that run in the longitudinal direction of the plastic profile 20 and are spaced apart from one another by means of separating crosspieces. The holders in the plastic profile 20 are open on the longitudinal side, and one electrical conductor is mounted in one holder, in each instance. Furthermore, the separating crosspieces themselves have longitudinal slots or longitudinal grooves that run in the longitudinal direction of the plastic profile 20, into which slots or grooves second projections 24 of the second connection box 10a . . . 10c can project when the second connection box 10a . . . 10c is mounted on the energy supply bus 4 (see also FIG. 9).

Clipping the said wires in is advantageous, but it is not the only conceivable possibility. The wires could also be embedded into the plastic profile 20, for example, and, in particular, have the plastic of the plastic profile 20 injection-molded around them. The plastic profile 20 and the electrical conductors of the first and second voltage bus 17 and 19 are part of the energy supply bus 4.

In this example, the first and second contacts 16 and 18 are configured as spring contacts, and thereby a low contact resistance occurs. Furthermore, two mechanically independent contacts 16 and 18 are provided for contacting of an electrical conductor, in each instance. As a result, power transmission can take place in even better and more reliable manner. Of course, it is also possible, however, that only one contact is provided per electrical conductor and/or that contacts 16, 18 of a different design are used. The contacts 16, 18 pass the electrical voltage taken from the first and second voltage bus 17, 19 on to an electronic circuit that lies in the interior of the first connection box 7 and/or to connectors of the first connection box 7.

A connection jack 21a, which can be provided on the first connection box 7, serves for connecting a data transmission cable, in particular a data bus system (compare also FIG. 10). A further optional connection jack 21b serves for connecting a further data transmission cable, which is connected with a further first connection box 7 at its other end. In this manner, a data signal is distributed to the first connection boxes 7 in simple manner. Furthermore, the first connection box 7 can also have a connection jack 21c, with which a sensor can be connected, for example for detecting a piece good. The connection jacks 21a . . . 21c project through the recess 15 in the first frame profile 2 in this example.

In general, it is advantageous if the first connection box 7, 7a, 7b has a jack/a plug for connecting the first actuator 5, and the second connection box 10a, 10b has terminals for connecting the second actuator 8. In this manner, the second connection box 10a, 10b can be used in significantly more flexible manner, since the second actuator 8 connected with it does not need to have a matching plug/a matching jack. The terminals of the second connection box 10a, 10b can be configured as screw terminals or spring terminals, for example. Of course, the second connection box 10a, 10b can also have a jack and/or a plug, in addition to or alternatively to the terminals (see also FIG. 6).

The first connection boxes 7, 7a, 7b and the second connection boxes 10, 10a, 10b are identical, in a further possible embodiment of the conveyor system 1, with regard to the external dimensions and/or placement of contacts 16, 18 for contacting with the electrical energy supply bus 4. This means that what has been said with regard to FIG. 3, relating to the first connection box 7, applies without restrictions also to the second connection boxes 10a, 10b. In the said manner, both types of connection boxes 7a, 7b and 10a, 10b can be installed on the conveyor system 1 without adaptations. For example, both connection boxes 7a, 7b and 10a, 10b can be attached to ("clipped onto") the frame profile 2 in the same manner, using an engagement connection.

Fundamentally, however, a second connection box 10a, 10b can also differ structurally from the first connection box 7, 7a, 7b. FIG. 4 shows a detail of a conveyor system 1 from the inside and at a slant from below in this regard. In FIG. 4, a first connection box 7 is shown next to a second connection box 10c having a different design. By means of the proposed measures, the first and second connection boxes 7, 7a, 7b and 10c can be optimally adapted to their purpose of use.

In FIG. 4, the good electrical connection of the motor 5 of the conveying roller 6 with the first connection box 7, by way of a connection jack 21d, can also be seen, in particular. An additional connection jack 21e can also be provided on the first connection box 7, with which jack a further drive (not shown) can be connected.

By analogy with FIG. 3, FIG. 5 shows a second connection box 10c and the energy supply bus 4 at a slant from the rear in an exploded representation. What has been said with regard to FIG. 3 applies in equivalent manner also analogously to the arrangement shown in FIG. 5, which is additionally shown from the other side in FIG. 6.

The second connection box 10c shown in FIGS. 5, 6, and 9 shows engagement projections 22a, 22b, using which the second connection box 10c is mounted on (which means "clipped onto") the energy supply bus 4. In particular, the second connection box 10c is mechanically connected only with the electrical energy supply bus 4. This means that the second connection box 10c is not directly connected with the first frame profile 2, but rather only connected indirectly by way of the energy supply bus 4 mounted on the first frame profile 2. In this regard, the engagement projections 22a, 22b can interact with the electrical conductors 17, 19 of the energy supply bus 4 and/or—as shown in FIGS. 5, 6, and 9—with an insulator of the same, which is formed by the plastic profile 20, for example, in that the electrical conductors 17, 19 of the energy supply bus 4 are embedded or clipped in. In this regard, the engagement projections 22a, 22b surround the plastic profile 20 with shape fit on its top and underside. Of course, it is also conceivable that the second connection box 10c has only one engagement projection 22a and that an undercut is provided in place of the engagement projection 22b.

This means that the second electrical connection box 10c is both electrically and mechanically connected with the electrical energy supply bus 4 (and only with it) by means of the proposed measures. Using the engagement projections 22a, 22b, the second electrical connection box 10c can be mounted on the energy supply bus 4 in the region of the first frame profile 2, in particular in tool-free manner. Disassembly can also take place without tools, or, if necessary, a tool is used, for example a screwdriver for unlocking the engagement projections 22a, 22b.

Furthermore, the second connection box 10c has two first projections 23 spaced apart from one another in the longitudinal direction of the first frame profile 2, which projections project into a recess 15 or into multiple recesses 15 of the first frame profile 2, as is shown in FIGS. 7 and 8. The (center) distance a between the first projections 23 is smaller, in this regard, than the width b of a recess 15, measured in the longitudinal direction of the first frame profile 2, but greater than the distance c between two recesses 15. In this manner, the second connection box 10c can be locally fixed in place in the longitudinal direction of the first frame profile 2. In this regard, the two projections 23 of the second connection box 10c project either into the same recess 15 of the frame profile 2 (see FIG. 7) or into adjacent recesses 15 (see FIG. 8). In the latter case, a crosspiece of the frame profile 2 that lies between the two recesses 15 lies between the two projections 23.

Specifically, the outside distance between the two first projections 23—as shown in FIGS. 7 and 8—can essentially correspond to the width b of a recess 15, and the inside distance between the two first projections 23 can essentially correspond to the distance c between two recesses 15. As a result, a displacement of the second connection box 10c in longitudinal direction of the first frame profile 2 is practically entirely precluded. Local fixation of the second connection box 10c is advantageous but not compulsory. Instead, it is also conceivable that the second connection box 10c has no such projections 23, and is freely displaceable in the longitudinal direction of the first frame profile 2.

Furthermore, the second connection box 10c also has second projections 24, which lie between the electrical conductors 17, 19 of the energy supply bus 4 in the assembled state. In this concrete case, the second projections 24 project into longitudinal slots that are situated in the separating crosspieces of the plastic profile 20, between the conductors 17, 19. As a result, the electrical conductors 17, 19 are particularly well positioned in the region of the second connection box 10c, and, in particular, are held well in the plastic profile 20 into which the electrical conductors 17, 19 are clipped. The method of action can be specifically seen well in FIG. 9, in which a partial section of the first frame profile 2 and the energy supply bus 4 are shown in cross-section X (compare FIG. 4). The method of action of the engagement projections 22a, 22b, and the fact that the energy supply bus 4 is attached at a slight distance from the first frame profile 2, using spacers 27, can also be seen well. This is advantageous but not compulsory. Instead, it is also conceivable that the energy supply bus 4 is mounted directly on the first frame profile 1. In this regard, the upper and lower flanks of the plastic profile 20 can particularly be configured with an undercut, in order to allow the second connection box 10c to be locked on.

The second connection box 10c shown in FIGS. 4 to 9 furthermore also has a holder 25, on which a cable tie can be attached, in order to be able to attach or secure a cable 11 that leads to the second actuator 8. Preferably, the holder 25 has an opening through which a cable tie can be threaded.

Finally, the second connection box 10c has two connection jacks 26a, 26b for connecting second actuators 8. The connection jack 26a, 26b specifically serves to supply voltage to the second actuator 8. For this purpose, the two connection jacks 26a, 26b can be connected with the first voltage bus 17, or both connection jacks 26a, 26b are connected with the second voltage bus 19. It is also conceivable that the connection jack 26a is connected with the first voltage bus 17, and the connection jack 26b is connected with the second voltage bus 19. The two connection jacks 26a, 26b can also be connected with one or more (different) outputs of a voltage converter. The voltage applied to the two connection jacks 26a, 26b can be the same or different. In particular, a voltage of 24 V can be applied to the connection jacks 26a, and a voltage of 48 V can be applied to the connection jack 26b. Of course, fewer or more than two connection jacks 26a, 26b can also be provided. A connection jack 26a, 26b can also be connected with a data bus. The possibilities mentioned above are also illustrated once again in FIG. 10. Furthermore, it is noted that what has been said with regard to the connection boxes 26a, 26b can also be applied analogously to plugs and terminals of the second connection box 106c.

FIG. 10 now shows a schematic electrical circuit diagram of an exemplary conveyor system 1. The circuit diagram shows the energy supply bus 4, which has the first voltage bus 17 and the second voltage bus 19, in concrete terms. The first connection box 7 comprises a roller controller 28 and a drive controller 29. The drive controller 29 is connected with the first voltage bus 17 and with the roller motor 5. For example, drive controller 29 can contain an electronic circuit for operation of the roller motor 5, for example an H bridge and/or an inverter for production of a rotational field. The roller controller 28 typically contains a communication module for communication with a central controller (not shown), as well as a microprocessor, which derives control signals for the drive controller 29 from the received commands, among other things. By way of the connection line between the roller controller 28 and the drive controller 29 shown in FIG. 10, signals are thereby transmitted, in particular, to the control connectors of the power transistors (in other words to the base or the gate of a transistor, for example) in the drive controller 29.

In this example, the roller controller 28 is connected with the second voltage bus 19. In contrast, the motor 5 is connected essentially with the first voltage bus 17 (in terms of power). With regard to the function of the roller controller 28 and the drive controller 29, the first voltage bus 17 can also be viewed or referred to as a "power voltage bus," and the second voltage bus 19 can also be viewed or referred to as a "control voltage bus."

"Essentially connected with the first voltage bus in terms of power" particularly does not mean that the entire electrical power transmitted to the motor 5 must come from the drive controller 29. A small part can also be contributed by the roller controller 28, and this particularly holds true if bipolar transistors are used for controlling the motor 5. Typically, however, the proportion coming from the roller controller 28 or from the second voltage bus 19 amounts to less than 5%. In other words, more than 95%, in particular, of the electrical power transmitted to the actuator 5 comes from the drive controller 29 or from the first voltage bus 17.

In a variant of the invention, the second voltage bus 19 merely serves to supply energy, whereas data are also transmitted wirelessly, or also, as shown in FIG. 10, by way of a separate data bus 34 (see also jacks 21a, 21b in FIG. 3). However, data can fundamentally also be modulated onto the second voltage bus 19 (Powerline Communication).

By means of the proposed measures, the components installed in a conveyor system 1 can be uncoupled from one another with regard to their energy supply. For example, as shown in FIG. 10, relative high-power actuators 5 are connected with the first voltage bus 17, whereas the roller controllers 28 having a low power demand are connected with the second voltage bus 19. As a result, the roller controllers 28 are uncoupled from the first voltage bus 17. Interference on the first voltage bus 17, for example caused by the drive controller 29 (e.g. a circuit that generates a rotational field and is variable in power, for drive of a brushless motor 5), does not have any effect on the roller controllers 28. In particular, the roller controllers 28 themselves are not impaired even in the event of a total failure of the first voltage bus 17, and can continue to deliver and store signals for determining the position of conveyed objects (for example, a Hall sensor of the motor 5 can be connected with the roller controller 28). Re-startup of the conveyor system 1 is thereby facilitated. In particular, the nominal power of the first voltage bus 17 can exceed the nominal power of the second voltage bus 19 by at least ten times.

In a particular embodiment of the conveyor system 1, the nominal voltage of the first voltage bus 17 is also different from the nominal voltage of the second voltage bus 19, and, in particular, exceeds it by at least two times. In particular, a voltage of 48 VDC can be applied to the first voltage bus 17, and a voltage of 24 VDC can be applied to the second voltage bus 19. Of course, the voltages at the first voltage bus 17 and at the second voltage bus 19 can also be different, and these can also carry an alternating voltage.

As a result, the currents transmitted by way of the first voltage bus 17 can be kept low in spite of comparatively great electrical power, and therefore the cable cross-sections also stay small. In particular, the conductor cross-sections of the first voltage bus 17 and of the second voltage bus 19 differ by maximally two times, or are actually the same (as is the case in the examples shown in FIGS. 1 to 9), and thereby contacting of the first and second connection box 7, 7a, 7b, and 10a . . . 10c is facilitated.

For example, the first connection box 7 can have control electronics (in the case shown, therefore, the roller controller 28 and the drive controller 29) for the first actuator 5, whereas the second connection box 10a . . . 10c has no such control electronics. These can be part of the second actuator 8, for example.

A conveying section supplied by a supply module (e.g. voltage supply or power supply unit) can have fifty or more motorized conveying rollers 6a, 6b, for example. The power demand of the conveying rollers 6a, 6b and thereby the nominal power of the said supply module can be well estimated during planning and development of a conveyor system 1, whereas the power demand of the second actuators 8 is still unknown, under some circumstances, in the development of a conveyor system 1, and results from customer requirements during the planning phase. In order to be able to react correspondingly flexibly to customer wishes, it is advantageous if the contacts 16, 18 of the first connection box 7, which produce the electrical connection with the energy supply bus 4, are configured for transmission of a nominal current/a nominal power of the first actuator 5, and contacts 16, 18 of the second connection box 10a . . . 10c, which produce the electrical connection with the energy supply bus 4, are configured for transmission of a nominal current/a nominal power of the energy supply bus 4. As a result, clearly greater electrical power can be transmitted to the second actuator 8 than to the first actuator 5. For the example mentioned, this means that fifty times the electrical power of the first connection box 7, 7a, 7b can be transmitted by way of the second connection box 10a . . . 10c.

However, it is also advantageous if the contacts 16, 18 of the first connection box 7, 7a, 7b, which produce the electrical connection with the energy supply bus 4, and the contacts 16, 18 of the second connection box 10a . . . 10c, which produce the electrical connection with the energy supply bus 4, are configured for transmission of a nominal current/a nominal power of the energy supply bus 4. In this manner, the same contacts 16, 18 can be used for the first connection box 7, 7a, 7b and the second connection box 10a . . . 10c, and thereby cost advantages for the overall system occur, under some circumstances, due to standardization, although the contacts 16, 18 of the first connection box 7, 7a, 7b are actually over-dimensioned, from a technical point of view.

In particular, the contact size in the two above examples can relate to the first voltage bus 17 and to the first contacts 16.

In FIG. 10, two examples of second electrical connection boxes are shown. The second connection box 10a shown on the right in FIG. 10 is connected, like the first connection box 7, with the first voltage bus 17, the second voltage bus 19, and the data bus 34. However, the second connection box 10a does not have any controllers 28, 29, but rather the single electronic circuit disposed in the second connection box 10a is a voltage converter 30. In this manner, the second actuator 8, which is connected with the second connection box 10a, is independent of the voltage at the first voltage bus 17. The voltage converter 30 can be configured as a step-up converter, a step-down converter or a combined (adjustable) voltage converter. It can furthermore be possible to adjust the voltage converter 30 to fixed values (approximately 5 V, 12 V, 24 V, 48 V) or also variably. Furthermore, the output voltage can be a direct voltage or an alternating voltage. This means that the voltage converter 30 can, in an advantageous embodiment variant—depending on the voltage on the first voltage bus 17—convert a direct voltage into an alternating voltage or vice versa.

By means of the proposed measures, even second actuators 8 that are actually unsuitable with regard to their nominal voltage can be installed in the conveyor system 1. As a result, custom-built systems, for example at the customer's request, can be implemented.

In particular, it can also be advantageous if the second actuator 8 is essentially (or also exclusively) connected with the first voltage bus 17 by way of the second connection box 10a, in terms of power, as is shown in FIG. 10. Furthermore, it can be advantageous if the supply voltage U2 passed on to the second actuator 8 by the second connection box 10a corresponds to the voltage at the second voltage bus 19. By means of the proposed measures, the second voltage bus 19 is kept free of high-power consumers and of problems caused by them, even if the second voltage bus 19 would lend itself to connection of the second actuators 8 with regard to its nominal voltage.

For control of the second actuator 8, a controller 31 for the second actuator 8 is furthermore provided in FIG. 10, which controller comprises a flap controller 32 and a drive controller 33. The drive controller 33 approximately corresponds, in terms of its function, to the drive controller 29 for the first actuator 5, and the flap controller 32 approximately corresponds to the roller controller 28. In this case, the second actuator 8 is essentially connected, in terms of power, with the first voltage bus 17 (i.e. in particular, more than 95% of the electrical power transmitted to the second actuator 8 comes from the first voltage bus 17). However, the controller 31 for the second actuator 8 is not part of the second connection box 10a, but rather is provided as a separate part. For example, this controller is made available by the vendor of the second actuator 8 or is actually also part of the second actuator 8. The voltage of the second voltage bus 19 and of the data bus 34 is therefore transparently passed on to the controller 31 for the second actuator 8, by the second connection box 10a.

In a variant of the invention, it is also conceivable that the data signal for the valve controller 32 is made available by way of a data cable connected with the first connection box 7. The controller 31 is then connected both with a first connection box 7 and also with a second connection box 10a. Fundamentally, the function of the flap controller 32 could also be made available by the first connection box 7. Control signals for the drive controller 33 can then be transmitted by way of the data cable connected with the first connection box 7 and with the controller 31.

A further design of a second connection box 10d, shown in FIG. 10, merely passes the voltage of the first voltage bus 17 on to the second actuator. The second actuator 8 is thereby exclusively connected with the first voltage bus 17 by way of the second connection box 10d.

A further special embodiment of the second connection box 10b has an outlet or is configured for connection of such an outlet (see FIG. 2). In the second connection box 10b, a voltage converter 30 is then disposed, which makes an outlet alternating voltage of 110 VAC and/or 230 VAC and/or 400 VAC available.

In this manner, standard devices (cleaning devices, vacuum cleaner, compressor, drill, grinding machine, and the like), for example, can be briefly connected with the conveyor system during overhauls of the conveyor system 1, without excessively long extension cables being required. Since the conveyor system 1 is at a standstill during the overhaul, in any case, the connected consumers can draw the entire nominal power of the energy supply bus 4. For example, an input direct voltage of 48 VDC can be transformed to an output alternating voltage of 230 VAC.

In this connection, it is also conceivable that second connection boxes 10*a*, 10*b*, which make a dangerous output voltage available (in particular greater than 48 V), are only switched to be active in a maintenance case. However, they remain inactive during regular operation. For example, this can be done by means of a relay that is energized or dropped by means of a corresponding command of a central controller. This relay can be part of the second connection box 10*a*, 10*b*. In particular, the voltage converter 30, which is disposed in the second connection box 10*a*, 10*b* as the sole electronic circuit, can have such a switching possibility.

It is furthermore conceivable that second connection boxes 10*a*, 10*b* that deliver a dangerous output voltage (in particular greater than 48 V) are mounted on the conveyor system 1 only temporarily, in any case, for example for the duration of a maintenance procedure. For example, the maintenance personnel can bring such a second connection box 10*a*, 10*b* along and temporarily install it at the maintenance location. As a result, it is possible to do without extension cables, but also it is not necessary for a plurality of second connection boxes 10*a*, 10*b* with outlets to be installed in the conveyor system 1. The gain in convenience for maintenance personnel can therefore be achieved with little technical effort.

In a further aspect of the invention, electrical devices (cleaning devices, vacuum cleaner, compressor, drill, grinding machine and the like) required for a maintenance case and/or spare parts are stored in a loading device in an automated storage unit of the conveyor system 1, and, when needed, conveyed to the location at which maintenance is to take place, in an automated storage unit with storage shelves and at least one shelf storage and retrieval device, and, when needed, conveyed to the location at which maintenance is to take place, using a shelf storage and retrieval device and/or using conveying elements of the conveyor system 1, in particular using a provisioning conveyor and/or lifter and/or paternoster elevator and/or using motor rollers 6*a*. The loading device can, in particular, also contain a second connection box 10*a*, 10*b* having an outlet for the devices mentioned, and, of course, can also contain a non-motorized tool (e.g. wrench, screwdriver and the like). In this manner, maintenance personnel can go the maintenance location without having to carry (heavy) equipment along. In the same manner, the tool and defective components of the conveyor system 1 can be transported away using this (or another) loading device. Maintenance of the conveyor system 1 can therefore be carried out significantly more conveniently and also more efficiently than was possible until now. A shelf storage and retrieval unit, a shelf operating device, a provisioning conveyor, a lifter, and a paternoster elevator are known as such, and are therefore not described in detail here and also not shown in the figures.

The loading device can furthermore be designed to have noticeable coloring or can also have a signal light (for example a rotating light), for example. In this manner, maintenance personnel can be guided to the maintenance location. Complicated path descriptions or reading of complicated plans can therefore be eliminated.

In connection with second connection boxes 10*a*, 10*b* that make a dangerous output voltage (in particular greater than 48 V) available, it can be advantageous if the first/second frame profile 2 is connected with a protective ground wire, the second connection box 10*a*, 10*b* is electrically connected with the first/second frame profile 2, and the second connection box 10*a*, 10*b* makes a protective ground wire connector available on the output side. In this manner, even electrical devices that are not protectively insulated can be operated at the second connection box 10*a*, 10*b*, which makes an outlet, for example for 110 VAC, 230 VAC and/or 400 VAC or a connector for such an outlet available. It is also conceivable, of course, that for this purpose, a separate protective ground wire is provided, which is in the Special Part of the energy supply bus 4.

Figure 12:
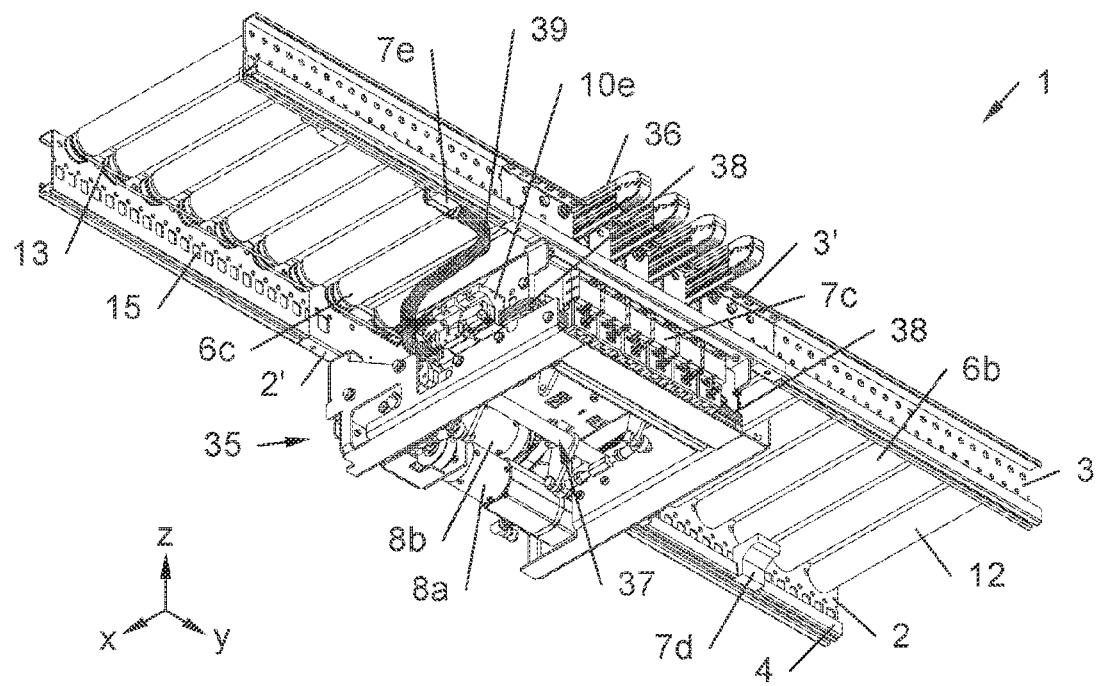

FIGS. 11 and 12 finally show a further detail of the exemplary conveyor system 1. In concrete terms, FIG. 11 shows the conveyor system 1 at a slant from above, FIG. 12 at a slant from below. The conveyor system 1 has a transfer module 35 shown in FIGS. 11 and 12, which module allows conveying of piece goods transversely to the conveying direction y. In the example shown, conveying takes place in the x direction, but conveying at a slanted angle relative to the conveying direction y would also be conceivable. For this purpose, the transfer module 35 has several drivable belts 36, which are disposed between two motor rollers 6*c*, in each instance. The motor rollers 6*c* are attached between the first frame profile 2' of the transfer module 35 and the second frame profile 3' of the transfer module 35. The first actuator 5 for drive of the at least one motor roller 6*c* (conveying element) is not shown, for reasons of a better overview. The belts 36 can be lowered below the conveying surface formed by the motor rollers 6*c* or raised above it. For vertical adjustment in the z direction, the transfer module 35 has a lifting motor 8*a*, which drives a lifting mechanism 37. For drive of the belts 36, the transfer module 35 has a transverse conveyor motor 8*b*. The mechanical function of a transfer module 35 is fundamentally known and will not be explained here in detail, but rather only briefly.

In the embodiment shown, the transfer module 35 comprises an electrical actuator 8*a*, which is formed by the lifting motor, and an electrical actuator 8*b*, which is formed by the transverse conveyor motor. The actuator 8*a* serves for drive of the lifting mechanism 37, which forms a functional element. The actuator 8*b* serves for drive of the belt 36 or the belts 36, which forms a functional element or form functional elements, respectively.

If a piece good is to be moved transversely to the conveying direction y, the belts 36 are raised with the lifting motor 8*a* and the lifting mechanism 37, and put into motion with the transverse conveyor motor 8*b*. If a piece good is to be moved in the conveying direction y, the belts 36 are adjusted to the lowered position, using the lifting motor 8*a* and the lifting mechanism 37, and the motor rollers 6*c* are turned on. The transverse conveyor motor 8*b* can subsequently be turned off, but fundamentally it can also remain activated; this is particularly advantageous if movements of piece goods in the y direction and x direction are to be performed in rapid sequence. The same holds true for the motor rollers 6*c*, which are shut off in the raised position of the lifting mechanism 37 or can remain active.

In the example shown, the belts 36 are disposed between the motor rollers 6*c*. This is advantageous but not compulsory. The transfer module 35 could also have passively driven rollers 12 or free-running rollers 14. Furthermore, it is noted that a transfer module 35 does not need to have the precisely shown number of belts 36 and motor rollers 6c, but rather this number can also deviate from the concrete example shown.

The lifting motor 8a and the transverse conveyor motor 8b are supplied with electrical energy by way of at least one second connection box 10e; the motor rollers 6c are supplied by way of the first connection boxes 7c. The first connection boxes 7c and the second connection boxes 10e, which are disposed on the frame of the transfer module 35 in the region of the second frame profile 3', are set onto the energy supply bus 38 of the transfer module 35 and electrically connected in this manner. These second connection boxes 10e are connected with further first connection boxes 7d, 7e using connection cables 39, which are disposed in part on the first frame profile 2 and in part on the second frame profile 3. In this manner, continuous energy supply along the conveyor system 1, beyond the transfer module 35 takes place (Comment: the right connection cable 39 cannot be seen in FIG. 12, but is present in reality).

The energy supply bus 38 can be configured in the same manner as the energy supply bus 4 or differently. Fundamentally, what has been said with regard to the energy supply bus 4 with regard to the exemplary embodiments previously disclosed applies analogously also to the energy supply bus 38 shown in FIGS. 11 and 12. Likewise, electrical contacting of the first connection boxes 10e with the energy supply bus 38 can take place in the manner explained for connection of the first connection box 7, 7a, 7b and/or second connection box 10a . . . 10d with the energy supply bus 4, above, in connection with the contacts 16, 18. Something similar also holds true for the components installed in a first connection box 7, 7a, 7b and/or second connection box 10a . . . 10d, such as, for example, outlets, connection jacks 21a . . . 21e, 26a, 26b, voltage converters 30 and the like. The relevant technical teaching can, of course, also be applied to the first connection boxes 7c and/or the second connection boxes 10e of the transfer module 35, without restrictions.

In the example shown, the motor rollers 6c are connected with the first connection boxes 7c, and the lifting motor 8a and the transverse conveyor motor 8b are connected with the at least one second connection box 10e. Of course, it would also be conceivable that the lifting motor 8a or the transverse conveyor motor 8b is connected with a first connection box 7c. Furthermore, it is noted that the lifting motor 8a and the transverse conveyor motor 8b can be connected with different second connection boxes 10e or with a single second connection box 10e. Also, an additional second connection box 10e can be provided, with which the connection cable 39 is connected, and which is configured in such a manner that it only produces the electrical connection between the connection cable 39 and the energy supply bus 38 of the transfer module 35.

Furthermore, it is conceivable that a flap or a rejecter 9, as shown in FIG. 1, for example, is disposed in the region of the transfer module 35. This can be used for stopping a piece good that is to be conveyed in the transverse direction, so that it cannot unintentionally leave the region of the transfer module 35 (for example due to its mass inertia). The flap/the rejecter 9 can also be electrically connected with a second connection box 10e.

It is noted that in FIGS. 11 and 12, the connection cable between the motor rollers 6c and the first connection boxes 7c, and the connection cable between the second connection box 10e and the lifting motor 8a/transverse conveyor motor 8b are not shown.

It is also noted that the transfer module 35 in FIGS. 11 and 12 and in the above description is described as part of a (larger) conveyor system 1. However, it is also conceivable to interpret the transfer module 35 itself as a conveyor system. The arrangement shown in FIGS. 11 and 12 would accordingly have three conveyor systems that are coupled or connected with one another.

By means of the proposed measures, a modular system of multiple electrical connection boxes 7, 7a . . . 7e, 10a . . . 10e is also implemented, which system has a first electrical connection box 7, 7a . . . 7e and a second electrical connection box 10a . . . 10e.

The exemplary embodiments show possible embodiment variants of a conveyor system 1, 35 and of a connection box 10a . . . 10e, and of a modular system of first connection boxes 7, 7a . . . 7e and second connection box 10a . . . 10e, respectively, where it is noted, at this point, that the invention is not restricted to the embodiment variants of the disclosed apparatuses that are specifically shown, but rather diverse combinations of the individual embodiment variants with one another are possible, and this variation possibility lies within the ability of a person skilled in the art of this technical field, on the basis of the teaching for technical action provided by the present invention. Embodiment variants are also possible, which arise from a combination of the individual details of the embodiment variants that are shown and described.

In particular, it is also stated that the apparatus shown can also comprise more or fewer components, in reality, than are shown. In part, the apparatuses shown or their components can also be shown not to scale and/or enlarged and/or reduced in size.

The task on which the independent inventive solutions are based can be found in the description.

REFERENCE SYMBOL LISTING

| | |
|---|---|
| 1 | conveyor system |
| 2, 2' | first frame profile |
| 3, 3' | second frame profile |
| 4 | energy supply bus |
| 5 | first actuator (outer rotor motor) |
| 6, 6a . . . 6c | motor roller |
| 7, 7a . . . 7e | first connection box |
| 8, 8a, 8b | second actuator |
| 9 | rejecter |
| 10a . . . 10e | second connection box |
| 11 | connection cable |
| 12 | passively driven conveying roller |
| 13 | belt |
| 14 | free-running roller |
| 15 | recess in frame profile |
| 16 | contacts for first voltage bus |
| 17 | first voltage bus |
| 18 | contacts for second voltage bus |
| 19 | second voltage bus |
| 20 | plastic profile |
| 21a . . . 21e | connection jack, first connection box |
| 22a, 22b | engagement projection |
| 23 | first projection |
| 24 | second projection |
| 25 | holder |
| 26a, 26b | connection jack, second connection box |
| 27 | spacer |
| 28 | roller controller |
| 29 | drive controller |
| 30 | voltage converter |
| 31 | controller for second actuator |
| 32 | flap controller |
| 33 | drive controller |

| | |
|---|---|
| 34 | data bus |
| 35 | transfer module |
| 36 | belt |
| 37 | lifting mechanism |
| 38 | energy supply bus |
| 39 | connection cable |
| a | distance between first projections 23 |
| b | width of recess 15 |
| c | distance between recesses 15 |
| U1 | input voltage |
| U2 | output voltage |

The invention claimed is:

1. A conveyor system (1, 35) for conveying of piece goods, having
a first and a second frame profile (2, 3, 2', 3'),
an electrical energy supply bus (4, 38), which is disposed along the first frame profile (2, 2') and/or second frame profile (3, 3'),
a first actuator (5), configured as an electrical rotary motor, for drive of at least one conveying element (6a ... 6c), which is mounted on the first frame profile (2, 2') and/or second frame profile (3, 3'),
a first electrical connection box (7, 7a ... 7e), by means of which box the first actuator (5) is connected with the energy supply bus (4, 38), which box is equipped with first control electronics (29, 30), and is mounted on the first/second frame profile (2, 3, 2', 3'), on which the electrical energy supply bus (4, 38) is also disposed, and
a second electrical actuator (8, 8a, 8b) for drive of a functional element (9, 36, 37), wherein the second electrical actuator (8, 8a, 8b) differs from the first electrical drive motor (5) with regard to its nominal voltage,
wherein
a second electrical connection box (10a ... 10e) is provided, by means of which box the second actuator (8, 8a, 8b) is connected with the energy supply bus (4, 38), and which box is mounted in the region of the first/second frame profile (2, 3, 2', 3'), on which the electrical energy supply bus (4, 38) is also disposed.

2. The conveyor system (1, 35) according to claim 1, wherein the second electrical connection box (10a ... 10e) is mounted on the first/second frame profile (2, 3, 2', 3') and connected with the electrical energy supply bus (4, 38) in the same manner as the first connection box (7, 7a ... 7e).

3. The conveyor system (1, 35) according to claim 1, wherein the second electrical connection box (10a ... 10e) is connected both electrically and mechanically with the electrical energy supply bus (4, 38).

4. The conveyor system (1, 35) according to claim 1, wherein the first/second frame profile (2, 3, 2', 3') has multiple recesses (15) spaced apart from one another in the longitudinal direction of the first/second frame profile (2, 3, 2', 3'), and the second connection box (10a ... 10e) has two first projections (23) spaced apart from one another in the longitudinal direction of the first/second frame profile (2, 3, 2', 3'), wherein the distance (a) between the first projections (23) is smaller than the width (b) of a recess (15), measured in the longitudinal direction of the first/second frame profile (2, 3, 2', 3'), but greater than the distance (c) between two recesses (15).

5. The conveyor system (1, 35) according to claim 1, wherein the second electrical connection box (10a ... 10e) has second projections (24), which lie between electrical conductors (17, 19) of the energy supply bus (4, 38).

6. The conveyor system (1, 35) according to claim 1, wherein contacts (16, 18) of the first connection box (7), which produce the electrical connection with the energy supply bus (4, 38), are configured for transmitting a nominal current/a nominal power of the first actuator (5), and contacts (16, 18) of the second connection box (10a ... 10e), which produce the electrical connection with the energy supply bus (4, 38), are configured for transmitting a nominal current/a nominal power of the energy supply bus (4, 38).

7. The conveyor system (1, 35) according to claim 6, wherein the contacts correspond to the first contacts (16), which produce the electrical connection with the first voltage bus (17) of the energy supply bus (4, 38).

8. The conveyor system (1, 35) according to claim 1, wherein contacts (16, 18) of the first connection box (7, 7a ... 7e), which produce the electrical connection with the energy supply bus (4, 38), and contacts (16, 18) of the second connection box (10a ... 10e), which produce the electrical connection with the energy supply bus (4, 38), are configured for transmitting a nominal current/a nominal power of the energy supply bus (4, 38).

9. The conveyor system (1, 35) according to claim 1, wherein the energy supply bus (4, 38) has a first voltage bus (17) and a second voltage bus (19), separate from the former.

10. The conveyor system (1, 35) according to claim 9, wherein the nominal power of the first voltage bus (17) exceeds the nominal power of the second voltage bus (19) by at least ten times.

11. The conveyor system (1, 35) according to claim 9, wherein the nominal voltage of the first voltage bus (17) is different from the nominal voltage of the second voltage bus (19) and, in particular, exceeds it by at least two times.

12. The conveyor system (1, 35) according to claim 9, wherein the first electrical connection box (7, 7a ... 7e) and the second electrical connection box (10a ... 10e) comprise first contacts (16), which are connected with the first voltage bus (17), and/or comprises second contacts (18), which are connected with the second voltage bus (19).

13. The conveyor system (1, 35) according to claim 9, wherein the second actuator (8, 8a, 8b) is essentially connected with the first voltage bus (17) by way of the second connection box (10a_10e), in terms of power.

14. The conveyor system (1, 35) according to claim 13, wherein the supply voltage (U2) passed on to the second actuator (8, 8a, 8b) by the second connection box (10a ... 10e) corresponds to the voltage at the second voltage bus (19).

15. The conveyor system (1, 35) according to claim 1, wherein the supply voltage (U2) passed on to the second actuator (8, 8a, 8b) by the second connection box (10a ... 10e) is adjustable.

16. The conveyor system (1, 35) according to claim 1, wherein the first/second frame profile (2, 3, 2', 3') is connected with a protective ground wire, the second connection box (10a ... 10e) is electrically connected with the first/second frame profile (2, 3, 2', 3'), and the second connection box (10a ... 10e) makes a protective ground wire connector available on the output side.

17. A modular system of multiple electrical connection boxes (7, 7a ... 7e, 10a ... 10e), having a first electrical connection box (7, 7a ... 7e), which box is equipped with first control electronics (28, 29), and which box is configured for being mounted on a frame profile (2, 3, 2', 3') of a conveyor system (1, 35), being connected with an electrical energy supply bus (4, 38), and electrically connecting a first actuator (5) with the energy supply bus (4, 38), comprising
  a second electrical connection box (10a . . . 10e), which box is configured for being mounted in the region of the said frame profile (2, 3, 2', 3') and for being connected with an electrical energy supply bus (4, 38), as well as for electrically connecting a second actuator (8, 8a, 8b) with the energy supply bus (4, 38), which actuator differs from the first actuator (5) with regard to its nominal voltage.

18. The modular system according to claim 17, wherein the second connection box (10a . . . 10e) differs structurally from the first connection box (7, 7a . . . 7e).

19. The modular system according to claim 17, wherein the first connection box (7, 7a . . . 7e) and the second connection box (10a . . . 10e) are identical with regard to their external dimensions and/or placement of contacts (16, 18) for contacting with the electrical energy supply bus (4, 38).

20. The modular system according to claim 17, wherein a voltage converter (30) is disposed in the second connection box (10a . . . 10e) as the sole electronic circuit.

21. The modular system according to claim 20, wherein the voltage converter (30) is configured for converting an input direct voltage (U1) to an output alternating voltage (U2) or for converting an input alternating voltage (U1) to an output direct voltage (U2).

22. The modular system according to claim 17, wherein the first connection box (7, 7a . . . 7e) has a jack/a plug for connection of the first actuator (5), and the second connection box (10a . . . 10e) has terminals for connection of the second actuator (8, 8a, 8b).

23. A second electrical connection box (10a . . . 10e), which is configured for being installed in the region of a first/second frame profile (2, 3, 2', 3') of a conveyor system (1, 35) and for being connected with an electrical energy supply bus (4, 38), as well as for electrically connecting a second actuator (5) with the energy supply bus (4, 38),
  wherein
    a voltage converter (30) is disposed in the second connection box (10a . . . 10e), which makes available an output alternating voltage of 110 VAC and/or 230 VAC and/or 400 VAC.

24. The second electrical connection box (10a . . . 10e) according to claim 23, wherein this box can be mounted in the region of the first/second frame profile (2, 3, 2', 3') without tools.

25. A conveyor system (1, 35) for conveying of piece goods, having
  a first and a second frame profile (2, 3, 2', 3');
  an electrical energy supply bus (4, 38), which is disposed along the first frame profile (2, 2') and/or second frame profile (3, 3');
  a first actuator (5), configured as an electrical rotary motor, for drive of at least one conveying element (6a . . . 6c), which is mounted on the first frame profile (2, 2') and/or second frame profile (3, 3');
  a first electrical connection box (7, 7a . . . 7e), by means of which box the first actuator (5) is connected with the energy supply bus (4, 38), which box is equipped with first control electronics (29, 30), and which box is mounted on the first/second frame profile (2, 3, 2', 3'), on which the electrical energy supply bus (4, 38) is also disposed; and
  a second electrical actuator (8, 8a, 8b) for drive of a functional element (9, 36, 37);
wherein
  a second electrical connection box (10a . . . 10e) is provided, by means of which box the second actuator (8, 8a, 8b) is connected with the energy supply bus (4, 38), and which box is mounted in the region of the first/second frame profile (2, 3, 2', 3'), on which the electrical energy supply bus (4, 38) is also disposed;
  the energy supply bus (4, 38) has a first voltage bus (17) and a second voltage bus (19) that is separate from the former;
  the first electrical connection box (7, 7a . . . 7e) and the second electrical connection box (10a . . . 10e) comprise first contacts (16), which are connected with the first voltage bus (17); and
  the second connection box (10a . . . 10e) is structurally different from the first connection box (7, 7a . . . 7e), wherein
a) the second connection box (10d) is configured for passing the voltage of the first voltage bus (17) on to the second actuator (8, 8a, 8b), wherein the second electrical actuator (8, 8a, 8b) differs from the first actuator (5) with regard to its nominal voltage and/or
b) the first actuator (5), which is connected with the first electrical connection box (7, 7a . . . 7e), is supplied with a voltage of 48 V, and the second actuator (8, 8a, 8b), which is connected with the second electrical connection box (10a . . . 10e), is supplied with a voltage of 48 V.

26. The conveyor system (1, 35) according to claim 25, wherein the first voltage bus (17) has a voltage of 48 V, and the second voltage bus (19) has a voltage of 24 V.

27. The conveyor system (1, 35) according to claim 26, wherein a sensor having an operating voltage of 24 V is connected with the first connection box (7, 7a . . . 7e), and a further second actuator (8, 8a, 8b) with an operating voltage of 24 V is connected with the second connection box (10a . . . 10e).

28. The conveyor system (1, 35) according to claim 25, wherein the first connection box (7, 7a . . . 7e) and the second connection box (10a . . . 10e) are identical with regard to their placement of contacts (16, 18) for contacting with the electrical energy supply bus (4, 38).

* * * * *